United States Patent
Tischer et al.

(10) Patent No.: US 9,595,055 B2
(45) Date of Patent: Mar. 14, 2017

(54) FEEDBACK SERVICE

(71) Applicant: AT&T Intellectual Property I, L.P., Atlanta, GA (US)

(72) Inventors: Steven Neil Tischer, Atlanta, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 86 days.

(21) Appl. No.: 14/091,871

(22) Filed: Nov. 27, 2013

(65) Prior Publication Data

US 2015/0149315 A1     May 28, 2015

(51) Int. Cl.
  *G06Q 30/00*     (2012.01)
  *G06Q 30/06*     (2012.01)
  *G06Q 50/00*     (2012.01)

(52) U.S. Cl.
  CPC ..... *G06Q 30/0601* (2013.01); *G06Q 30/0643* (2013.01); *G06Q 50/01* (2013.01)

(58) Field of Classification Search
  CPC ............ G06Q 30/0601–30/0645; G06Q 30/08
  USPC ............................................... 705/26.1–27.2
  See application file for complete search history.

(56) References Cited

U.S. PATENT DOCUMENTS

| | | | |
|---|---|---|---|
| 7,424,439 B1 | 9/2008 | Fayyad et al. | |
| 7,890,363 B2 | 2/2011 | Gross | |
| 8,515,893 B2 | 8/2013 | Wilson et al. | |
| 2005/0027612 A1* | 2/2005 | Walker ................... | G06Q 30/02 705/26.7 |
| 2006/0143071 A1 | 6/2006 | Hofmann | |
| 2009/0049051 A1 | 2/2009 | Horowitz et al. | |
| 2009/0248434 A1 | 10/2009 | Pfeffer et al. | |
| 2011/0183651 A1* | 7/2011 | Mundy et al. ............. | 455/414.1 |
| 2012/0053991 A1 | 3/2012 | Shimizu et al. | |
| 2012/0197896 A1 | 8/2012 | Li et al. | |
| 2012/0233020 A1* | 9/2012 | Eberstadt et al. ......... | 705/26.41 |

(Continued)

FOREIGN PATENT DOCUMENTS

WO     WO 2012080790     6/2012

OTHER PUBLICATIONS

Landsman, Stephanie, "Love It or Leave It—Growing Power of Customer Reviews," www.cnbc.com, Jun. 9, 2013.

(Continued)

*Primary Examiner* — William Allen
*Assistant Examiner* — Katherine O'Sullivan
(74) *Attorney, Agent, or Firm* — Hartman & Citrin LLC

(57) ABSTRACT

Concepts and technologies are disclosed herein for providing and interacting with a feedback service. A processor such as a computing system or a server computer can execute a feedback service. The feedback service can detect activity associated with an item at a user device. The item can be an item for sale and the activity can relate to a purchase of the item. The feedback service can generate a social networking post relating to the item. The social networking post can include a visual representation of the item and a solicitation for feedback from a social network. The feedback service can provide feedback relating to the social networking post. The feedback can include an opinion relating to the item and demographic information relating to an entity that provided the opinion. The feedback service can provide the feedback to the user device and/or other entities.

17 Claims, 9 Drawing Sheets

(56) References Cited

U.S. PATENT DOCUMENTS

| | | |
|---|---|---|
| 2012/0330716 A1 | 12/2012 | Volpe et al. |
| 2012/0330721 A1 | 12/2012 | Volpe et al. |
| 2013/0041837 A1* | 2/2013 | Dempski ............... G06Q 10/101 705/345 |
| 2013/0073400 A1 | 3/2013 | Heath |
| 2013/0073473 A1 | 3/2013 | Heath |
| 2013/0090998 A1 | 4/2013 | Shimogori |
| 2013/0117378 A1* | 5/2013 | Kotorov ................. G06Q 50/01 709/205 |
| 2013/0138479 A1 | 5/2013 | Mohan et al. |
| 2013/0218637 A1 | 8/2013 | Bikman et al. |
| 2013/0226657 A1 | 8/2013 | Bohe et al. |
| 2013/0246342 A1 | 9/2013 | Faith et al. |
| 2014/0365331 A1* | 12/2014 | Hafeez .......................... 705/26.7 |

OTHER PUBLICATIONS

"VirtualTRY: Virtual Try on eyewear clothes or jewel," retrieved at http://virtualtry.com/ on Oct. 29, 2013, VirtualTRY.

\* cited by examiner

FEEDBACK SERVICE

BACKGROUND

The prevalence of portable communication and computing devices has increased dramatically over the past several years. Some consumers may use smartphones and other portable Internet-capable devices for various purposes that were, until recently, either unavailable, or relegated to other computing devices such as desktop computers, workstations, or the like.

To meet the increasingly frequent and complex needs of users of Internet-capable devices, some device manufacturers and network operators have increased computing power of portable devices, increased bandwidth and/or speed of network connections, and taken other actions that can enable and/or support enhanced communication and/or computing needs of users for various purposes.

Thus, users may use portable computing devices to search the Internet, check account information, send and receive email messages, or for other purposes. These and other activities may occur at almost any time and almost any place. In addition to enabling frequent data communications to enhance a value of communications services, some network operators may use device and/or user information for various purposes. For example, a network operator may track usage and/or buying patterns of users, location information, or the like.

SUMMARY

The present disclosure is directed to providing and interacting with a feedback service. A user or other entity may consider making a purchase of a product or other item. As part of the consideration, the user or other entity may search the web, take a photograph, scan a barcode or quick response ("QR") code, execute a price check, or the like, relating to the product or item. It should be understood that some embodiments of the concepts and technologies described herein can be provided outside of a prospective purchase scenario, if desired. A user device can execute a feedback application that can be configured to detect the activity and to generate an activity representation that can include data relating to the product or item. The activity representation also can include a request for a web search, price search, or other relating to the product or item, or the like.

The user device can provide the activity representation to a feedback service that can be hosted or executed by a server computer. The feedback service can access or use a template relating to the product or item or can provide the template to the user device. The template can be provided by a device associated with, for example, a manufacturer, distributer, retailer, or the like, associated with the item. The user device or the feedback service can generate a representation of the product or item. The representation can include a synthetic image or photograph of a user with the product or item and can be generated, for example, by accessing photographs of the user or other entity on the user device, a social networking account, an image sharing site, or the like. The representation can be generated using the template.

The feedback service can generate the representation or obtain the representation from the user device, and generate a social networking post ("post"). The post can include the representation and a feedback solicitation that asks members of the user's or other entity's social network to comment on the product or item represented in the representation. The feedback service can upload the post to the social networking application for publication. The feedback service can be configured to obtain or receive feedback relating to the post and to analyze the feedback to detect opinions, ratings, reviews, trends, and/or other feedback relating to the product or item. The feedback service also can analyze the feedback to detect trends and/or opinions based upon demographics, or the like, associated with commenters associated with the feedback.

The feedback service can provide some or all of the feedback to the user device for presentation to a user or other entity and/or can generate feedback data that summarizes part or all of the feedback for other entities such as a manufacturer, or the like. The feedback service can provide the feedback data to a computing device associated with the other entities, and the other entities can use the feedback data to drive decisions relating to the product or item such as, for example, distribution in certain markets, product evolution, pricing, and/or the like. Thus, the concepts and technologies described herein can be used to provide rapid prototyping functionality relating to the product or item, which can allow entities to save money and/or time when evolving products and/or versions of products for specific markets. It should be understood that these examples are illustrative and therefore should not be construed as being limiting in any way.

According to one aspect of the concepts and technologies disclosed herein, a method is disclosed. The method can include detecting, at a processor executing a feedback service, activity associated with an item at a user device. The item can include an item for sale and the activity can relate to a purchase of the item. The method also can include generating a social networking post relating to the item. The social networking post can include a visual representation of the item and a solicitation for feedback from a social network. The feedback can relate to the item. Feedback can be obtained. The feedback can relate to the social networking post and can include an opinion relating to the item and demographic information relating to an entity that provided the opinion. The feedback can be provided to the user device.

In some embodiments, the feedback can include comments relating to the social networking post. The comments can be associated with social networking connections of an entity associated with the user device. The method also can include generating feedback data that can include a summary of the feedback, and providing the feedback data to a computing device. The computing device can be associated with a manufacturer of the item. In some embodiments, generating the social networking post can include obtaining a template associated with the item, the template being received from the computing device, obtaining an image of an entity associated with the user device, the image being obtained from a social networking service associated with the entity, and generating the visual representation. The visual representation can include the template and the image.

In some embodiments, the activity can include a scan of visual indicia associated with the item and a request for an electronic search relating to the item. The scan also can include an optical scan of a quick response code associated with the item. In some embodiments, generating the social networking post can include obtaining a template associated with the item, obtaining an image of an entity associated with the user device, and generating the visual representation. The visual representation can include the template and the image. The entity can include a user associated with the user device, and the image can be obtained from a social networking service associated with the user device. In some embodiments, generating the social networking post can include obtaining a template associated with the item, providing the template to the user device, and receiving, by the processor and from the user device, the visual representation. The visual representation can include the template and an image of an entity associated with the user device. The entity can include a user associated with the user device, and the image can be obtained from a data storage associated with the user device.

According to another aspect of the concepts and technologies disclosed herein, a system is disclosed. The system can include a processor and a memory. The memory can store computer-executable instructions that, when executed by the processor, cause the processor to perform operations. The operations can include detecting activity associated with an item at a user device. The item can include an item for sale and the activity can relate to a purchase of the item. The operations also can include generating a social networking post relating to the item. The social networking post can include a visual representation of the item and a solicitation for feedback from a social network, the feedback relating to the item. The operations also can include feedback relating to the social networking post. The feedback can include an opinion relating to the item and demographic information relating to an entity that provided the opinion. The feedback can be provided to the user device.

In some embodiments, the feedback can include comments relating to the social networking post, and the comments can be associated with social networking connections of an entity associated with the user device. The system also can include computer-executable instructions that, when executed by the processor, cause the processor to perform operations further including generating feedback data, which can include a summary of the feedback, and providing the feedback data to a computing device. The computing device can be associated with a manufacturer of the item. The system also can include computer-executable instructions that, when executed by the processor, cause the processor to perform operations that also can include obtaining a template associated with the item, the template being obtained from a computing device associated with a manufacturer of the item, providing the template to the user device, and receiving the visual representation from the user device. The visual representation can include the template and an image of an entity associated with the user device, and the visual representation can be included in the social networking post.

In some embodiments, the system also can include computer-executable instructions that, when executed by the processor, cause the processor to perform operations that can include obtaining a template associated with the item, the template being received from the computing device, and obtaining an image of an entity associated with the user device. The image can be obtained from a social networking service associated with the entity. The operations also can include generating the visual representation including the template and the image, and including, in the social networking post, the visual representation. In some embodiments, the user device can include a smartphone. The smartphone can present the feedback via a display device of the smartphone, and the feedback can include demographic information that identifies a location, age, and gender associated with the entity.

According to yet another aspect, a computer storage medium is disclosed. The computer storage medium can have computer-executable instructions stored thereon that, when executed by a processor, cause the processor to perform operations. The operations can include detecting activity associated with an item at a user device. The item can include an item for sale and the activity can relate to a purchase of the item. The operations also can include generating a social networking post relating to the item. The social networking post can include a visual representation of the item and a solicitation for feedback from a social network, the feedback relating to the item. The operations also can include obtaining feedback relating to the social networking post. The feedback can include an opinion relating to the item and demographic information relating to an entity that provided the opinion. The feedback can be provided to the user device.

In some embodiments, the operations further can include generating feedback data that can include a summary of the feedback, and providing the feedback data to a computing device. The computing device can be associated with a manufacturer of the item, and the feedback can include comments relating to the social networking post. The comments can be associated with social networking connections of an entity associated with the user device. In some embodiments, the operations further can include obtaining a template associated with the item, the template being obtained from a computing device associated with a manufacturer of the item, and providing the template to the user device. The operations also can include receiving the visual representation from the user device. The visual representation can include the template and an image of an entity associated with the user device. The visual representation can be included in the social networking post. In some embodiments, the operations further can include obtaining a template associated with the item, the template being received from the computing device, and obtaining an image of an entity associated with the user device. The image can be obtained from a social networking service associated with the entity. The operations also can include generating the visual representation, including the template and the image, and including the visual representation in the social networking post.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
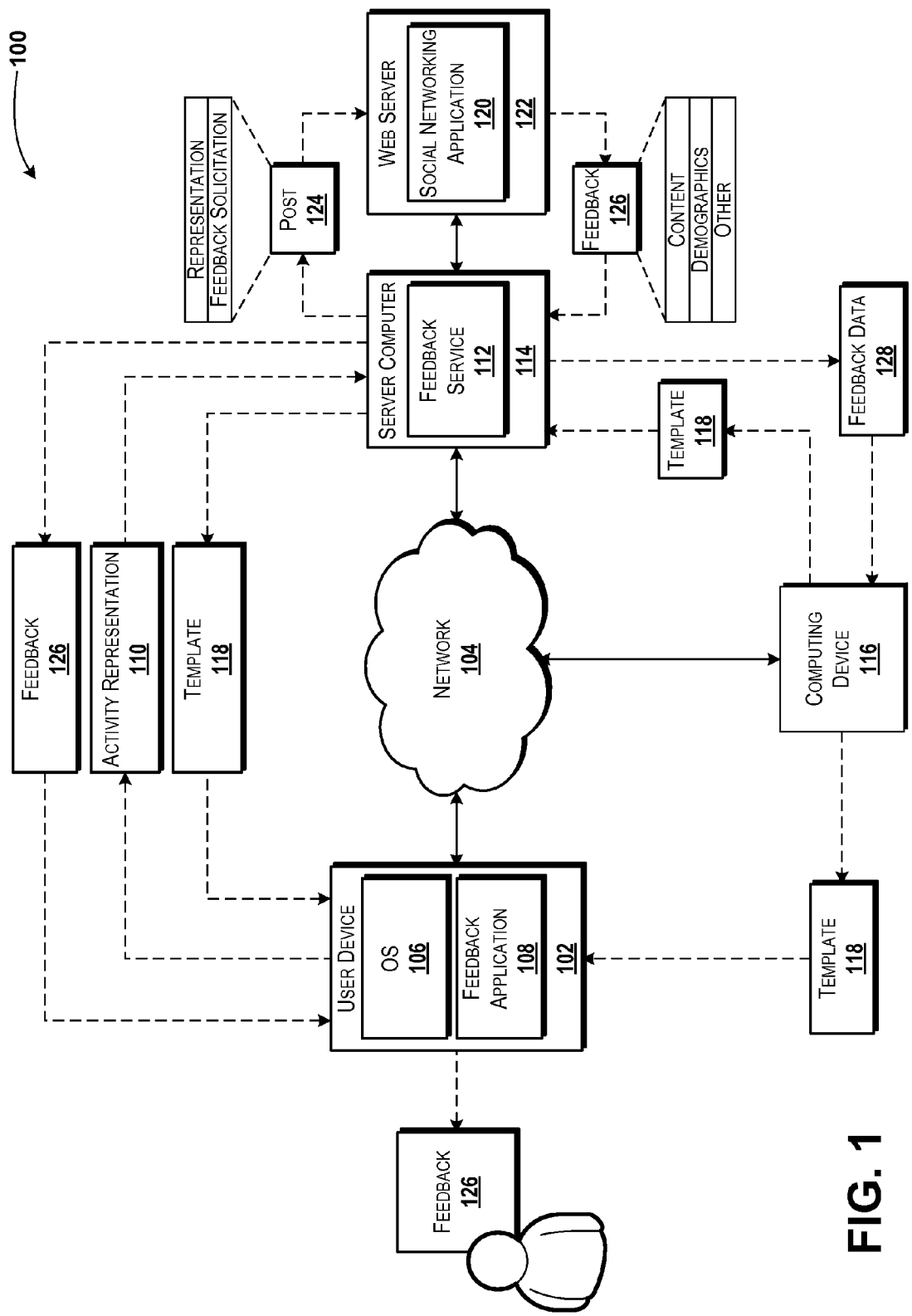
FIG. 1 is a system diagram illustrating an illustrative operating environment for the various embodiments disclosed herein.

The following detailed description is directed to providing and interacting with a feedback service. A user or other entity may search the web, take a photograph, scan a barcode or quick response ("QR") code, execute a price check, or the like, relating to a product or item. A user device can execute a feedback application that can be configured to detect the activity and to generate an activity representation that can include data relating to the product or item. The activity representation also can include a request for a web search, price search, or other relating to the product or item, or the like.

The user device can provide the activity representation to a feedback service that can be hosted or executed by a server computer. The feedback service can access or use a template relating to the product or item or can provide the template to the user device. The template can be provided by a device associated with, for example, a manufacturer, distributer, retailer, or the like, associated with the item. The user device or the feedback service can generate a representation of the product or item. The representation can include a synthetic image or photograph of a user with the product or item and can be generated, for example, by accessing photographs of the user or other entity on the user device, a social networking account, an image sharing site, or the like. The representation can be generated using the template.

The feedback service can generate the representation or obtain the representation from the user device, and generate a social networking post ("post"). The post can include the representation and a feedback solicitation that asks members of the user's or other entity's social network to comment on the product or item represented in the representation. The feedback service can upload the post to the social networking application for publication. The feedback service can be configured to obtain or receive feedback relating to the post and to analyze the feedback to detect opinions, ratings, reviews, trends, and/or other feedback relating to the product or item. The feedback service also can analyze the feedback to detect trends and/or opinions based upon demographics, or the like, associated with commenters associated with the feedback.

The feedback service can provide some or all of the feedback to the user device for presentation to a user or other entity and/or can generate feedback data that summarizes part or all of the feedback for other entities such as a manufacturer, or the like. The feedback service can provide the feedback data to a computing device associated with the other entities, and the other entities can use the feedback data to drive decisions relating to the product or item such as, for example, distribution in certain markets, product evolution, pricing, and/or the like. Thus, the concepts and technologies described herein can be used to provide rapid prototyping functionality relating to the product or item, which can allow entities to save money and/or time when evolving products and/or versions of products for specific markets. It should be understood that these examples are illustrative and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and interacting with a feedback service will be described, according to an illustrative embodiment. The operating environment 100 shown in FIG. 1 includes a user device 102 operating in communication with and/or as part of a communications network ("network") 104. According to various embodiments, the functionality of the user device 102 may be provided by one or more mobile telephones or smartphones, one or more laptop computers, one or more tablet computers, one or more other computing systems, one or more smartwatches, combinations thereof, or the like. For purposes of describing the concepts and technologies disclosed herein, the user device 102 is described herein as a smartphone. Because other devices can be configured to provide the functionality described herein with respect to the user device 102, it should be understood that this example is illustrative and therefore should not be construed as being limiting in any way.

The user device 102 can execute an operating system 106 and one or more application programs such as, for example, a feedback application 108. The operating system 106 is a computer program for controlling the operation of the user device 102. The feedback application 108 can include an executable program configured to execute on top of the operating system 106 to provide various functions as described herein for obtaining and providing feedback. The user device 102 also can execute other application programs such as, for example, shopping applications, price check applications, social networking applications, navigation applications, web browsers, media capture applications, web applications or "apps," combinations thereof, or the like. Some additional application programs and/or components and functionality of the user device 102 will be illustrated and described herein.

The feedback application 108 can be configured to detect activity occurring at the user device 102 such as, for example, a barcode or quick response ("QR") code scan, a price search for a product or other item for sale, or other activity relating to a prospective purchase of product or other item. According to various embodiments of the concepts and technologies described herein, the user device 102 can be configured to identify a product or other item with which the activity detected at the user device 102 is detected. In some other embodiments, the user device 102 and/or the feedback application 108 can provide a representation of the activity ("activity representation") 110 to a feedback service 112, and the feedback service 112 can take various actions with respect to the activity representation 110, as will be explained in more detail herein.

In some embodiments of the concepts and technologies described herein, the feedback application 108 can be configured to monitor activity occurring at the user device 102. For example, the feedback application 108 can be configured to detect product searches or queries, price checks or scans, and/or other commerce-related activity that can be understood, by the feedback application 108, to indicate that a user or other entity associated with the user device 102 is considering purchasing a product or other item. Based upon these and other considerations, the feedback application 108 can generate the activity representation 110, and submit the activity representation to the feedback service 112 or other service.

According to various embodiments, the feedback service 112 can include a server application or module executed or hosted by a computing device such as a server computer 114 or other computing device such as a desktop computer, a workstation, other computing systems, combinations thereof, or the like. According to some embodiments, the feedback service 112 can be a callable service that can be configured to provide aspects of the concepts and technologies described herein for soliciting and providing feedback, as will be explained in more detail below.

The feedback service 112 can be configured to receive the activity representation 110, and to take various actions with respect to the activity representation 110. In some embodiments, the feedback service 112 can receive the activity representation 110 and execute, based upon contents of the activity representation 110, a price search, a web search, a review or ratings search, combinations thereof, or the like relating to the product or item referenced within the activity representation 110. Thus, although not visible in FIG. 1, the feedback service 112 can query various electronic resources such as a website associated with a particular product or other item, a price check application, a review site or service, combinations thereof, or the like, to obtain and provide data to the user device 102.

According to some embodiments, the feedback service 112 can be configured to communicate with a computing device 116. According to various embodiments, the computing device 116 can be associated with, can be operated by, can be accessible by, and/or can report to a manufacturer of the product or item associated with the activity occurring at the user device 102. As such, the computing device 116 can be referred to as a "manufacturer computing device." It should be understood that this example is illustrative and therefore should not be construed as being limiting in any way.

In some embodiments, the feedback service 112 can communicate with the computing device 116 to obtain one or more templates 118 from the computing device 116. The templates 118 can be used to generate a synthetic image or other representation relating to the product or item associated with the activity, as will be explained in more detail below. The computing device 116 can, in response to a communication with the feedback service 112, provide a template 118 to the feedback service 112 or to the user device 102. According to various embodiments, the feedback service 112 and/or the feedback application 108 can generate a representation of the item or product.

The representation of the item or product can include a computer-generated image of the user associated with the user device 102 using, wearing, holding, or otherwise making use of the product or other item with which the activity is associated. This representation can be created using the template 118. Thus, it can be appreciated that the template 118 can correspond to an image, video, or the like, which can be superimposed on an image of the user associated with the user device 102. Additionally, or alternatively, the template 118 can correspond to an image, video, or the like, with a cutout or other area through which a portion of an image, video, or other representation of the user associated with the user device 102 can be shown. Additionally, or alternatively, the template 118 can correspond to an overlay, or the like, which can be imposed on an image, video, or other representation of the user, a location associated with the user, or other person, location, item, or other entity. It should be understood that these examples are illustrative and therefore should not be construed as being limiting in any way.

According to some embodiments, the feedback service 112 can be configured to generate the representation. The feedback service 112 can be configured, by the user or other entities, to access a social networking account associated with the user. In some embodiments, the feedback service 112 can be configured to access a social networking application 120 executed, for example, by a web server 122. The user or other entity can provide credentials used by the feedback service 112 to access the social networking account of the user. By accessing the account, the feedback service 112 can access photographs, videos, or other representations associated with the user. Thus, it should be appreciated that the feedback service 112 can access photos, videos, or other representations of the user locally, by communicating with the user device 102, and/or by communicating with other devices or applications such as the web server 122 and/or the social networking application 120. It should be understood that these examples are illustrative and therefore should not be construed as being limiting in any way.

The feedback service 112 can be configured to generate the representation of the user holding, wearing, or otherwise using the product or item with which the activity was detected by using the template 118 and the photo, video, or other representation obtained from the user device 102, the social networking application 120, and/or other sources. In some other embodiments, the feedback service 112 can obtain the representation from the user device 102, as noted above. The feedback service 112 also can be configured to solicit feedback relating to the item or other product using the representation.

In particular, the feedback service 112 can be configured to generate a social networking post, a realtime message, or other post ("post") 124. The post 124 can include the representation and a solicitation for feedback ("feedback solicitation"). The feedback service 112 can access the social networking application 120 to upload the post 124 to a social networking account associated with a user of the user device 102. In one example embodiment, the feedback service 112 can generate a social networking post as the post 124, wherein the post 124 can include the representation of the user with the product or other item and a solicitation for feedback.

In one example, the product or item can correspond to a shirt or other piece of clothing. The template 118 can correspond to an image of the shirt or other piece of clothing. The feedback service 112 can generate a representation of the user wearing the shirt or other piece of clothing. For example, the template 118 can include an image of the shirt with a transparent portion through which the user's face can be visible if the template 118 is overlaid on an image of the user. Thus, the representation can appear to be an image of the user wearing the shirt or other product. The feedback service 112 can generate the post 124 to include a solicitation for feedback such as "what do you think?," "comments please," or the like. It should be understood that this example is illustrative and therefore should not be construed as being limiting in any way.

In response to viewing the post 124, one or more social networking connections associated with the user of the user device 102 may comment on the representation. The social networking application 120 can capture these comments or other activity and provide the comments or other information as feedback 126. The feedback 126 can be provided to the feedback service 112, or the feedback service 112 can be configured to view comments or other activity, recognize these comments or other activity as the feedback 126, and to download or otherwise obtain the feedback 126 from the social networking application 120. It should be understood that this example is illustrative and therefore should not be construed as being limiting in any way.

The feedback service 112 also can be configured to interpret the feedback 126 and/or to perform various types of analysis on the feedback 126. In particular, the feedback service 112 can be configured to identify various aspects of comments or other forms of feedback 126 provided in response to the post 124. The feedback service 112 can be configured to access the web server 122 to access the feedback 126, in some embodiments. In some other embodiments, web server 122 can be configured to provide the feedback 126 to the feedback service 112. Because the feedback service 112 can be configured to obtain the feedback 126 in additional and/or alternative ways, it should be understood that these examples are illustrative and therefore should not be construed as being limiting in any way.

As noted above, the feedback service 112 can be configured to analyze the feedback 126 based upon various aspects of the feedback 126 including, but not limited to, content, demographics, and/or other aspects of the feedback 126. The content of the feedback 126 can include, for example, a rating or review value; a comment; text of the comment; indicated and/or inferred emotions associated with the comments or ratings such as, for example, "likes" or "dislikes;" indications of reposts or retweets, or the like associated with the comments or ratings; and/or other content of the feedback 126. The feedback service 112 can be configured to analyze language of the comment or other feedback 126 to determine if the feedback 126 is positive or negative or neutral, a degree to which the feedback is positive or negative (if not neutral), specific aspects of the product or item mentioned or otherwise referenced in the feedback 126, or the like.

In particular, if an example comment to the post 124 reads "that shirt looks awesome, I like the collar," the feedback service 112 can be configured to recognize, from language analysis of the post 124, that the commenter who provided this comment likes the product or item associated with the post 124, and that the collar is specifically mentioned as a desirable feature of the product or item. Similarly, if a comment to the post 124 is negative or neutral, the feedback service 112 can be configured to recognize that, and interpret the feedback 126 in accordance with the determined tone and/or contents of the feedback 126. The feedback service 112 can be configured to analyze multiple comments or other feedback 126 associated with a post 124, and to determine an overall tone or rating, to identify trends associated with the tone or ratings, and the like. The feedback service 112 can be configured to summarize the content of the feedback 126 and to generate feedback data 128 that captures trends, if present. Additional aspects of the feedback data 128 will be addressed below.

The demographics associated with the feedback 126 can be obtained by communication with the social networking application 120 and/or by publically available information that the feedback service 112 can be configured to access via an application programming interface ("API") associated with the social networking application 120 or the web server 122, by an API associated with search engines or other applications or devices, or the like. Thus, the feedback service 112 can be configured to determine, for a particular instance of feedback 126 and/or for multiple instances of feedback 126, demographics such as, for example, age, gender, location, income, race, religion, or the like.

The feedback service 112 can be configured to determine trends associated with the demographics, content, and/or other aspects of the feedback 126, and to represent these and/or other trends in the feedback data 128. For example, a first comment to the post 124 may state "I like the shirt, but not the collar," and the demographics associated with the commenter may indicate that the comment was made by a female, age 20-24, who lives in New York City. A second comment to the post 124 may state "I like the shirt, especially the collar," and the demographics associated with the commenter may indicate that the comment was made by a female, age 20-24, who lives in Atlanta, Ga.

Based upon analysis of the content and demographics of these two example comments, the feedback service 112 can generate a summary that indicates that all feedback 126 associated with the shirt is positive, that half of the feedback 126 approves of the collar, and that half of the feedback 126 does not approve of the collar. Furthermore, the feedback service 112 can generate a summary that indicates that all feedback 126 from females, age 20-24, approve of the shirt; that all feedback 126 made by commenters living in the Northeast, New York, and/or New York City dislike the collar; and/or that all feedback 126 made by commenters living in the Southeast, Georgia, and/or Atlanta like the collar. Of course, with an increased number of comments or other feedback 126, the feedback service 112 can identify additional and/or alternative trends. It should be understood that these examples are illustrative and therefore should not be construed as being limiting in any way.

Thus, the feedback data 128 can include, for example, trends relating to the item or product associated with the post 124, as well as critiques and/or compliments associated with the product or item, demographics associated with specific and/or general critiques or compliments, combinations thereof, or the like. Thus, for example, if comments reference a type of granite used for a table top, the feedback data 128 can include a summary of comments or other feedback 126 that reference the granite, the tone and/or content of those comments or other feedback 126, demographics associated with various opinions and/or uniform opinions represented by the feedback 126, combinations thereof, or the like. The feedback service 112 can provide the feedback data 128 to the computing device 116, and the computing device 116 can output the feedback data 128 to one or more entities such as, for example, a manufacturer.

The manufacturer may pay for the feedback data 128 or other aspects of the feedback service 112. The manufacturer, for example, can use the feedback data 128 to provide rapid prototyping relating to the product or item, to generate different versions of the product or item for specific demographics, or the like. Thus, the manufacturer can use the feedback service 112 and/or the feedback data 128 to replace or supplement market research, advertising, or the like. In the above example of the shirt and collar, the manufacturer could determine (if the trends above hold for more than two comments, of course) that a shirt with the collar as commented on is appropriate for sale in Atlanta, Ga., and that a second version of the shirt with a different collar should be sold in New York City. It should be understood that these examples are illustrative and therefore should not be construed as being limiting in any way.

The feedback service 112 also can be configured to provide the feedback 126 to the user device 102 for presentation to a user or other entity. The feedback 126 can be provided to the user or other entity via a user interface or various forms of communication such as text messages, emails, web page links, reports, or the like. Some example user interfaces for communicating feedback 126 to the user or other entity are illustrated and described herein with reference to FIGS. 4A-4C.

In practice, a user or other entity may consider making a purchase of a product or other item. As part of the consideration, the user or other entity may search the web, take a photograph, scan a barcode or QR code, execute a price check, or the like, relating to the product or item. The user or other entity may use a user device 102 to perform these and/or other activity relating to the product or other item. The user device 102 can execute a feedback application 108 to detect the activity, and to generate an activity representation 110 that can include data relating to the product or item, a request for a web search relating to the product or item, a request for a price search relating to the product or item, or the like. The activity representation 110 can be provided to a feedback service 112 that can be hosted or executed by a server computer 114.

In some embodiments, the activity representation 110 can prompt a feedback service 112 executed or hosted by a server computer 114 to provide a template 118 relating to the product or item. The template 118 can be provided by a computing device 116 or other device associated with various entities such as, for example, a manufacturer, distributer, retailer, or the like. In some other embodiments, as explained above, the feedback service 112 can be configured to obtain the template 118 and to use the template 118 as explained herein.

According to various embodiments, the user device 102 and/or the feedback service 112 can be configured to generate a representation of the product or item referenced in the activity representation 110. The representation can include a synthetic image or photograph of a user with the product or item and can be generated, for example, by accessing photographs of the user or other entity on the user device 102, on a social networking account provided by a social networking application 120, and/or elsewhere. The representation can be generated using the template 118, as explained above in detail.

The feedback service 112 can generate the representation or obtain the representation from the user device 102, and generate a post 124 for the social networking site or service that includes the representation. The post 124 also can include a feedback solicitation that asks members of the user's or other entity's social network to comment on the product or item represented in the representation. The feedback service 112 can upload the post 124 to the social networking application 120 for publication.

The feedback service 112 can be configured to obtain or receive feedback 126 relating to the post 124, and to analyze the feedback 126 to detect opinions, ratings, reviews, trends, and/or other feedback relating to the product or item. The feedback service 112 also can analyze the feedback 126 to detect trends and/or opinions based upon demographics, or the like, associated with commenters associated with the feedback 126. The feedback service 112 can provide some or all of the feedback 126 to the user device 102 for presentation to a user or other entity and/or can generate feedback data 128 that summarizes part or all of the feedback 126 for other entities such as a manufacturer, or the like.

The feedback service 112 can provide the feedback data 128 to a computing device 116 associated with the other entities, and the other entities can use the feedback data 128 to drive decisions relating to the product or item such as, for example, distribution in certain markets, product evolution, pricing, and/or the like. Thus, the concepts and technologies described herein can be used to provide rapid prototyping functionality relating to the product or item, which can allow entities to save money and/or time when evolving products and/or versions of products for specific markets. It should be understood that these examples are illustrative and therefore should not be construed as being limiting in any way.

FIG. 1 illustrates one user device 102, one network 104, one server computer 114, one computing device 116, and one web server 122. It should be understood, however, that various implementations of the operating environment 100 include zero, one, or more than one user device 102, zero, one, or more than one network 104, zero, one, or more than one server computer 114, zero, one, or more than one computing device 116, and/or zero, one, or more than one web server 122. As such, the illustrated embodiment should be understood as being illustrative, and should not be construed as being limiting in any way.

Figure 2:
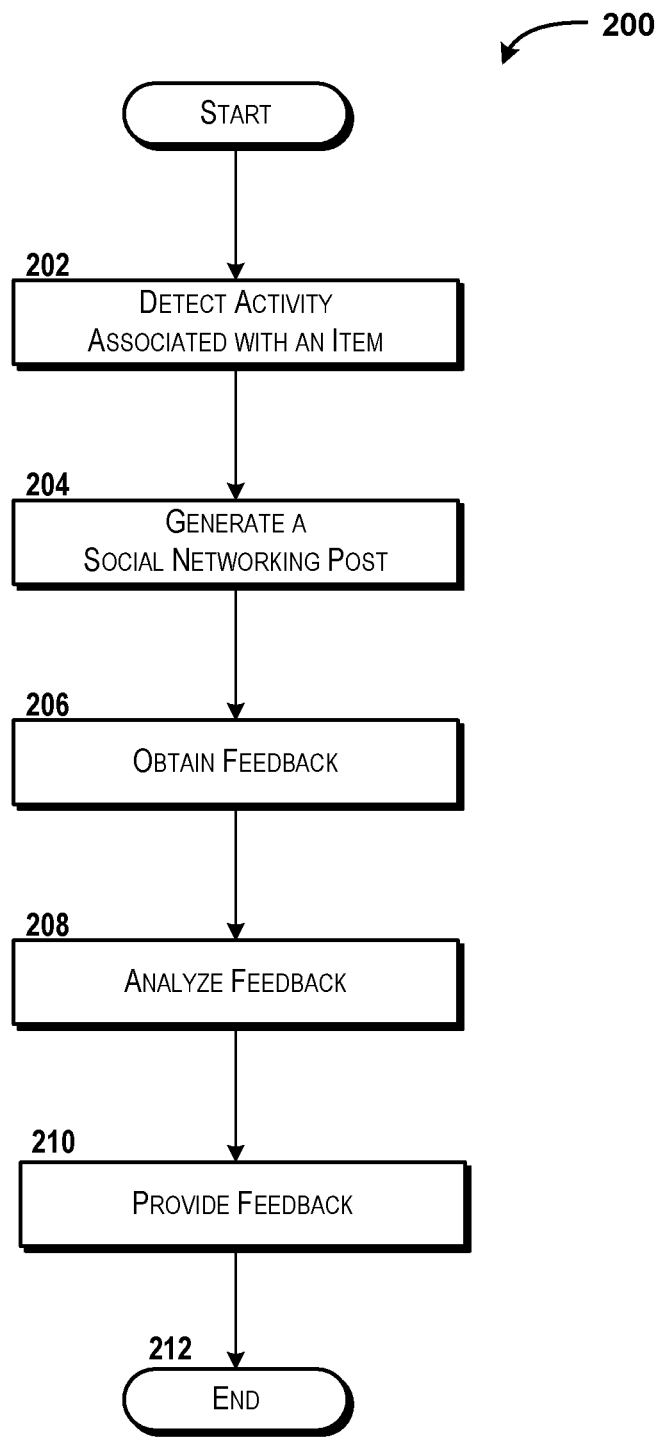
FIG. 2 is a flow diagram showing aspects of a method for obtaining and providing feedback using a feedback service, according to an illustrative embodiment.

Turning now to FIG. 2, aspects of a method 200 for obtaining and providing feedback 126 using a feedback service 112 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 114 to perform one or more operations and/or causing the processor to direct other components of the computing system or device to perform one or more of the operations.

For purposes of illustrating and describing the concepts of the present disclosure, the methods disclosed herein are described as being performed by the server computer 114 via execution of one or more software modules such as, for example, the feedback service 112. It should be understood that additional and/or alternative devices and/or network nodes can provide the functionality described herein via execution of one or more modules, applications, and/or other software including, but not limited to, the feedback service 112. Thus, the illustrated embodiments are illustrative, and should not be viewed as being limiting in any way.

The method 200 begins at operation 202. At operation 202, the server computer 114 can detect activity associated with a product or item ("item") at a user device 102 or other device or entity. As explained in detail above, the activity detected in operation 202 can correspond to various types of activity at the user device 102 or other device or entity, as well as activity associated with a user or other entity associated with the user device 102. According to various embodiments, the activity can correspond to a web search relating to the product or item; a price search relating to the product or item; a review or rating search relating to the product or item; a bar code, label, QR code, or other visual indicia scan relating to the product or item; a social networking post relating to the product or item; combinations thereof; or the like.

According to various embodiments, the user device 102 can communicate with the server computer 114 to execute these and/or other actions relating to the product or item. In some other embodiments, the user device 102 can execute these and/or other actions relating to the product or item, and the user device 102 can inform the server computer 114 regarding the activity. In these and/or other embodiments, the server computer 114 can receive an activity representation 110 from the user device 102 or elsewhere, where the activity representation 110 can indicate the action or activity and prompt the server computer 114 to perform various actions relating to the product or item as described herein. Because the server computer 114 can detect the interaction with the product or item in additional and/or alternative manners, it should be understood that these examples are illustrative and therefore should not be construed as being limiting in any way.

From operation 202, the method 200 proceeds to operation 204. At operation 204, the server computer 114 can generate a social networking post such as a post 124 to obtain feedback 126. As explained in detail above, but not necessarily shown explicitly in FIG. 2, the server computer 114 can be configured to generate or otherwise receive or obtain a representation of the product or item relating to the activity detected in operation 202. In some embodiments, for example, the user device 102 can obtain a template 118 that includes an image, video, or other visual depiction of the product or item and generate, using the template 118 and/or photos, videos, or other information stored at the user device 102 or elsewhere, a representation of the user or other entity with the product or item.

In some other embodiments, the server computer 114 can obtain the template 118 and provide the template 118 to the user device 102. The server computer 114 also can obtain the template 118 and generate the representation using, for example, photos, videos, or other depictions obtained from a social networking service or other location. Because the representation can be generated in additional and/or alternative ways, it should be understood that these examples are illustrative and therefore should not be construed as being limiting in any way.

The server computer 114 can generate the post 124. The post 124 can include the representation and a feedback solicitation that requests social networking comments or other feedback 126 relating to the product or item. The post 124 also can include an indication of the product or item for which feedback 126 is being requested. Thus, the post 124 can provide a depiction of the user or entity with the product or item, an indication of what the product or item is, and a request for social networking connections of the user or entity to provide feedback 126 relating to the product or item. Because the post 124 can include additional and/or alternative information and/or representations, it should be understood that these examples are illustrative and therefore should not be construed as being limiting in any way.

From operation 204, the method 200 proceeds to operation 206. At operation 206, the server computer 114 can receive feedback 126. As explained in detail above with reference to FIG. 1, the feedback 126 can include content, demographics information, and/or other information such as identities of commenters, commenter histories, commenter ratings, combinations thereof, or the like.

From operation 206, the method 200 proceeds to operation 208. At operation 208, the server computer 114 can analyze the feedback 126 received in operation 206. As explained in detail above, the server computer 114 can analyze the feedback 126 to identify trends and/or opinions associated with the item and/or product. The server computer 114 also can analyze various aspects of the feedback 126 such as the content, demographics, and/or other aspects, to detect and/or track trends or preferences associated with the product, associated with particular demographics, or the like. As such, operation 208 can include the analysis of the feedback 126 described herein, as well as trend discovery and/or development by the server computer 114. It should be understood that these examples are illustrative and therefore should not be construed as being limiting in any way.

From operation 208, the method 200 proceeds to operation 210. At operation 210, the server computer 114 can provide the feedback 126 to one or more entities. According to various embodiments, the server computer 114 can provide the feedback 126 to the computing device 116 or other system or device associated with a manufacturer, advertiser, wholesaler, retailer, distributer, or the like for the product or item associated with the activity detected in operation 202.

As explained above with reference to FIG. 1, the entity can use the feedback 126 to develop marketing strategies, to identify target demographics, to generate multiple versions of a product for various distribution, or the like. Thus, as explained above, the concepts and technologies described herein can be used to provide a rapid prototyping functionality that enables manufacturers to detect trends among particular demographics with regard to products, or the like, and to generate and/or distribute multiple versions of the product based upon the known and/or detected or developed trends or the like. It should be understood that these examples are illustrative and therefore should not be construed as being limiting in any way.

Additionally, or alternatively, the server computer 114 can provide feedback 126 to the user or other entity associated with the user device 102 and/or the activity detected in operation 202. The user device 102 can present the feedback 126 to the user or other entity, and the user or other entity can use the feedback 126 to influence, change, or bolster a purchasing decision, the consideration of which may have prompted execution of the method 200.

Some example user interfaces for presenting the feedback 126 are illustrated and described in detail below with reference to FIGS. 4A-4C. Because the feedback 126 can be used for additional and/or alternative reasons by the user device 102, and because the feedback 126 can be provided to additional and/or alternative entities, it should be understood that these examples are illustrative and therefore should not be construed as being limiting in any way.

From operation 210, the method 200 proceeds to operation 212. The method 200 ends at operation 212.

Figure 3:
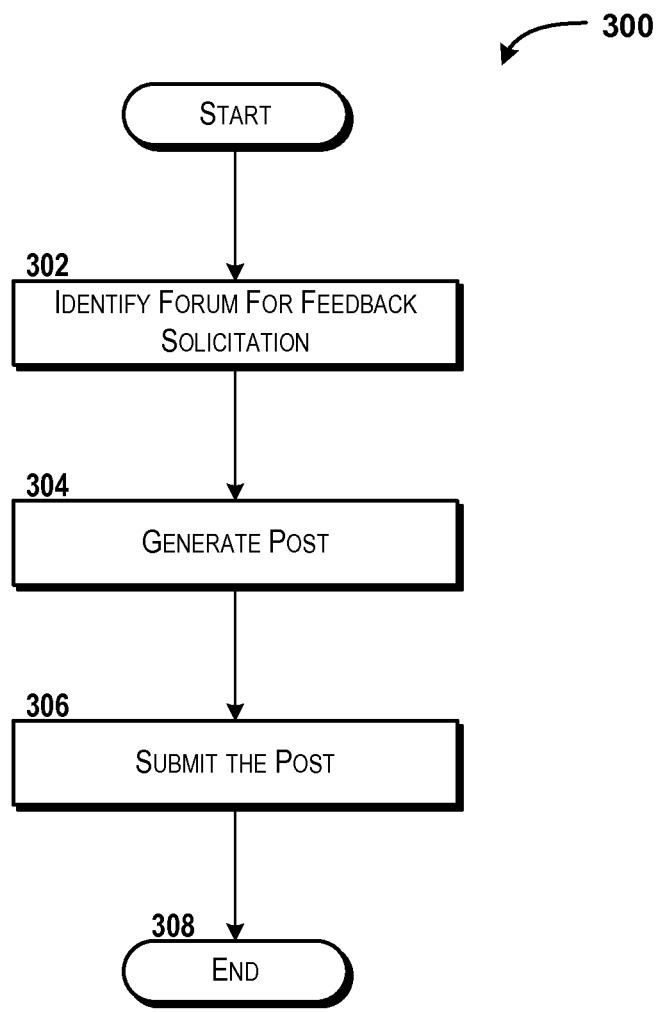
FIG. 3 is a flow diagram showing aspects of a method for generating and submitting a social networking post to obtain feedback using a feedback service, according to an illustrative embodiment.

Turning now to FIG. 3, aspects of a method 300 for generating and submitting a social networking post to obtain feedback 126 using a feedback service 112 will be described in detail, according to an illustrative embodiment. The method 300 begins at operation 302. At operation 302, the server computer 114 can identify a forum for a feedback solicitation. As explained above in detail, the forum can include a social networking service, for example a social networking site provided by execution of a social networking application 120 by a web server 122 such as the FACEBOOK social networking service; a realtime messaging service such as the TWITTER messaging service; a private social network; or the like. A user or entity can configure the server computer 114 to access one or more social networks associated with the user or other entity by, for example, providing passwords or other login credentials associated with the social networks.

The choice of a forum (or fora) and/or the providing of credentials or the like can be executed by a user or other entity via communications with the feedback service 112 hosted by the server computer 114 and/or via configurations associated with the feedback application 108 executed by the user device 102. Because the choice of a forum (or fora) and/or the configuration of communications with the forum (or fora) can be made in additional and/or alternative manners, it should be understood that these examples are illustrative and therefore should not be construed as being limiting in any way.

From operation 302, the method 300 can proceed to operation 304. At operation 304, the server computer 114 can generate a post 124. As explained in detail above, the server computer 114 can obtain or generate a representation of the user or other entity with the product or item associated with the feedback solicitation. The post 124 can include a visual representation of the user or entity that can be received by the server computer 114 or generated by the server computer 114. The representation can be generated using one or more images, videos, or other visual representations of the user or other entity. The representation also can be based upon a template 118 relating to the product or other item. The template 118 can be obtained from a computing device 116, in some embodiments.

The post 124 also can include an indication of the product or item for which feedback 126 is solicited. The text of the feedback solicitation can be set by preferences or settings. In some embodiments, the text of the post 124 can be approved by a user device 102 prior to publication. Thus, for example, the server computer 114 can generate the post 124 and obtain approval by a user or other entity prior to publishing the post 124 to the forum (or fora) identified in operation 302. Because the post 124 can include additional and/or alternative information, as explained herein in detail, it should be understood that these examples are illustrative and therefore should not be construed as being limiting in any way.

From operation 304, the method 300 proceeds to operation 306. At operation 306, the server computer 114 can submit the post 124 to the forum identified in operation 302. Thus, the server computer 114 can transmit the post 124 to the forum identified in operation 302 with instructions (explicit or implicit) to publish the post 124. The post 124 can be received by the selected forum (or multiple fora) and published.

From operation 306, the method 300 proceeds to operation 308. The method 300 ends at operation 308.

Figure 4A:
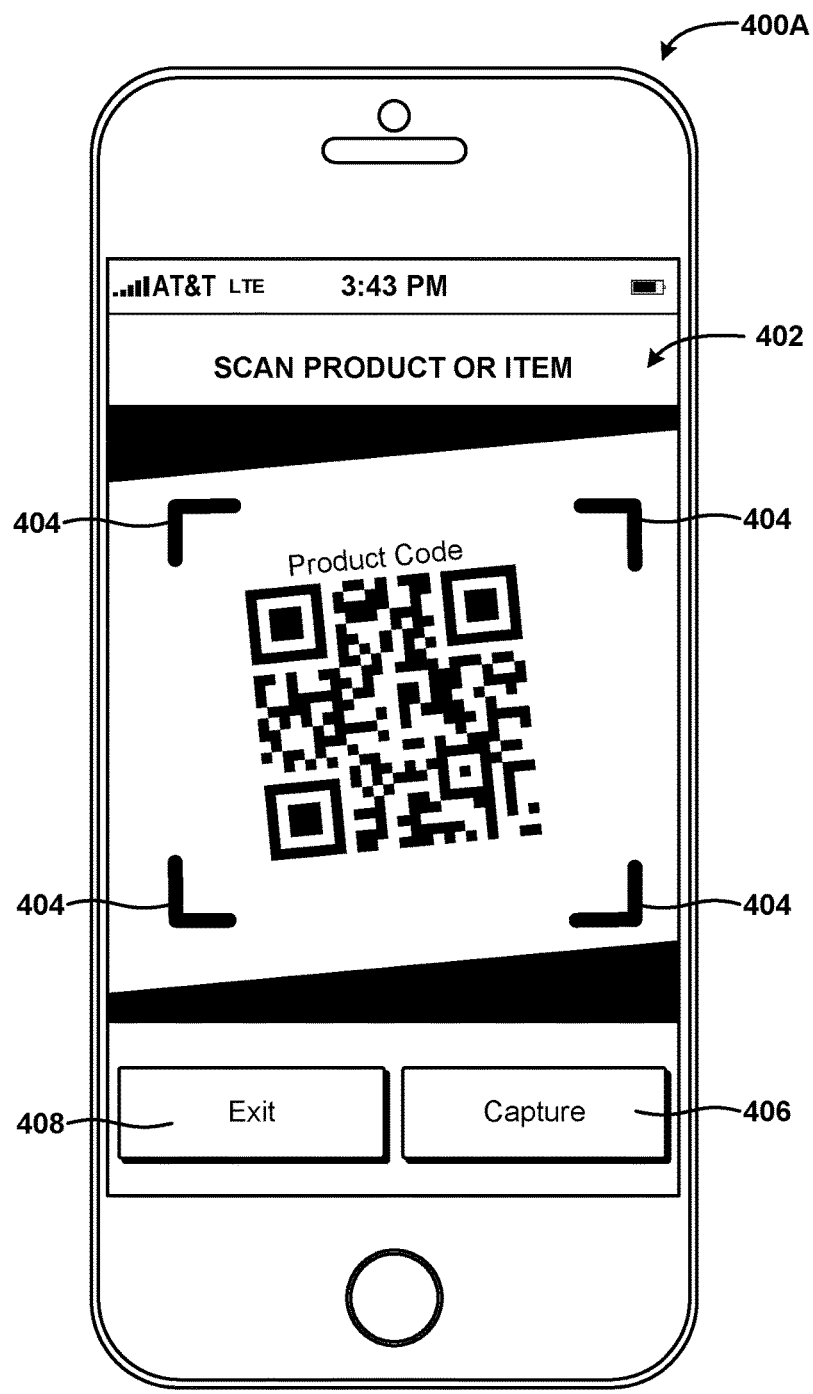
FIGS. 4A-4C are user interface diagrams illustrating aspects of user interfaces for providing and interacting with a feedback service, according to some illustrative embodiments.
Figure 4B:
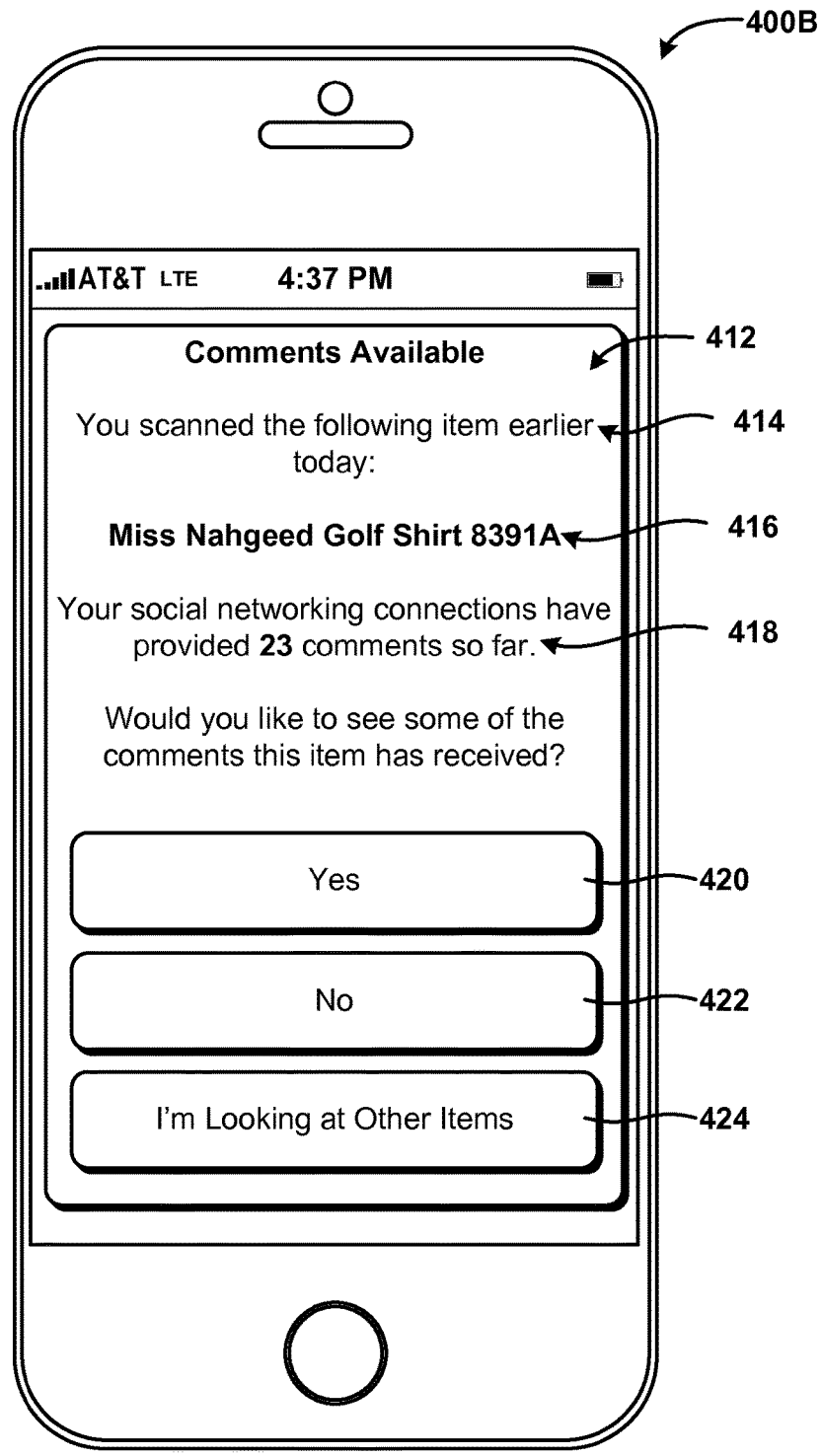
Figure 4C:
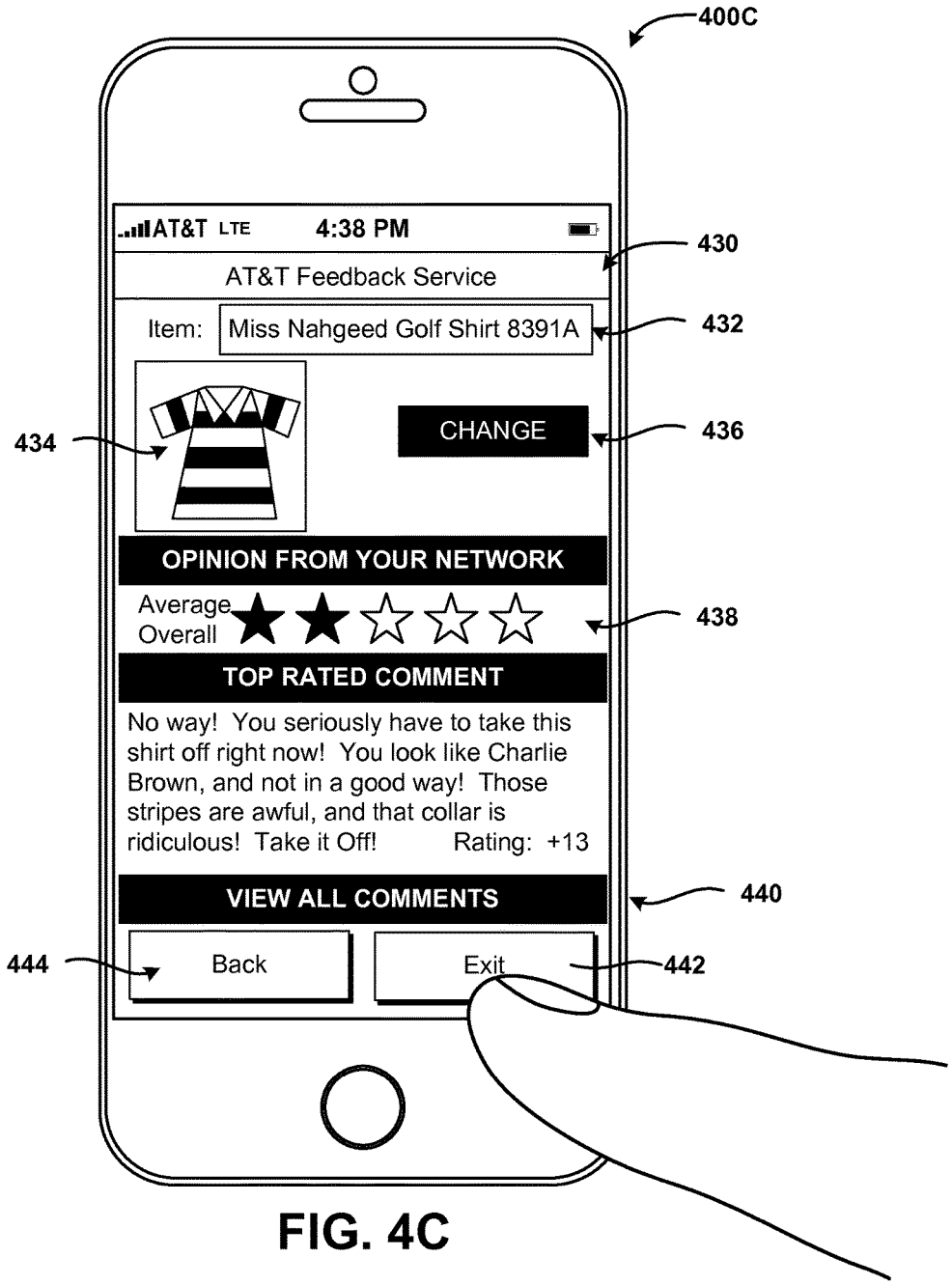

Turning now to FIGS. 4A-4C, UI diagrams showing various aspects of the concepts and technologies disclosed herein for providing and interacting with a feedback service 112 will be described according to various illustrative embodiments. FIG. 4A shows an illustrative screen display 400A generated by a device such as the user device 102. According to various embodiments, the user device 102 can generate the screen display 400A and/or other screen displays in conjunction with and/or based upon data received from the feedback application 108 and/or the feedback service 112 described herein. As noted above, the functionality associated with the feedback service 112 can be provided by a device remote from the user device 102 such as, for example, server computer 114. Similarly, the functionality associated with the feedback application 108 can be provided by an application program executing at the user device 102 and/or by applications executing remotely from the user device 102. It should be appreciated that the UI diagram illustrated in FIG. 4A is illustrative of one contemplated embodiment, and therefore should not be construed as being limited in any way.

Although not shown in FIG. 4A, the screen display 400A can include various menus and/or menu options. In FIG. 4A, the user device 102 is illustrated as displaying a user interface for capturing or scanning a product or item bar code, QR code, or other visual indicia. As shown in FIG. 4A, the feedback application 108 can access an imaging device of the user device 102 and display data captured with the imaging device on a screen display for a user or other entity. Thus, the user device 102 can be configured to guide a user through capturing or reading a QR code, bar code, or the like. It should be understood that near field communications, infrared, RFID, and/or other communications technologies can be used to capture an identifier associated with the product or other item instead of, or in addition to, using an image capture device as illustrated in FIG. 4A.

The screen display 400A can include an item identifier capture screen 402. The item identifier capture screen 402 can include text, graphics, and/or other information that explains or guides a user or other entity through capturing an identifier. As shown in FIG. 4A, though not necessarily included in all embodiments, the item identifier capture screen 402 can include visual guides 404. The visual guides 404 can be used to guide a user or other entity to enable the user or other entity to locate the user device 102 in or at an orientation and/or position at which a tag, label, or other surface bearing indicia of the item or product identifier can be scanned or captured.

The screen display 400A also can include a UI control 406 for scanning or capturing the product or item identifier when located at a desired location. It can be appreciated that the feedback application 108 can control the function of the user device 102 for scanning or capturing the product or item identifier, and that the capturing of the visual indicia can be triggered automatically upon the visual indicia being located at a position at which the capturing or reading is possible. As such, the UI control 406 can be omitted in some embodiments. The screen display 400A also can include a UI control 408 for exiting capturing or reading of the product or item identifier, if desired. Selection of the UI control 406 can cause the user device 102 to capture, scan, or read visual indicia from which the product or item can be identified, and selection of the UI control 408 can cause the user device 102 to close or exit the feedback application 108 and/or to cancel capturing, scanning, or reading of the visual indicia.

Thus, it should be appreciated that the screen display 400A can be used by a user or other entity to capture, scan, or read a product or item identifier to enable generation of the activity representation 110 and/or the representation described herein. Because additional or alternative UI controls can be included in the screen display 400A, and/or because additional or alternative actions can be taken in response to selection of the UI controls 406, 408 included in the screen display 400A, it should be understood that these embodiments are illustrative, and should not be construed as being limiting in any way.

FIG. 4B shows an illustrative screen display 400B generated by a device such as the user device 102. According to various embodiments, the user device 102 can generate the screen display 400B and/or other screen displays in conjunction with and/or based upon data received from the feedback service 112 described herein. It should be appreciated that the UI diagram illustrated in FIG. 4B is illustrative of one contemplated example of the UIs that can be generated and/or displayed in accordance with the concepts and technologies disclosed herein, and therefore should not be construed as being limiting in any way.

The screen display 400B can include a feedback or comments available display ("feedback available display 412"). The feedback available display 412 can be used to indicate, to a user or other entity associated with the user device 102, that feedback 126 is available. Thus, the feedback available display 412 can be used to provide comments or feedback to the user device 102, where the feedback 126 can relate to the post 124 described above and/or a representation generated by the feedback application 108 and/or the feedback service 112. It should be understood that the feedback available display 412 is illustrative of only one example of the available feedback displays and therefore should not be construed as being limiting in any way.

It should be appreciated that the screen display 400B can be presented, for example, in response to receiving the feedback 126 at the user device 102 from the feedback service 112 as explained above with reference to FIGS. 1-3. Because the screen display 400B illustrated in FIG. 4B can be displayed at additional and/or alternative times, it should be understood that this example is illustrative and therefore should not be construed as being limiting in any way. It should be understood that this embodiment is illustrative, and should not be construed as being limiting in any way.

The feedback available display 412 can explain that a comments or other form of the feedback 126 is available and/or relevant to activity associated with the user and/or a device associated with the user. In the illustrated embodiment, the feedback available display 412 includes an indication 414 of how the relevance of the feedback 126 has been determined. In the illustrated embodiment, the indication 414 indicates a source of the determined relevance, an indication 416 of the product or item for which feedback 126 is available, and an indication 418 of a quantity of comments or other feedback 126 that is available. In the illustrated embodiment, the indication 414 indicates that the user or other entity scanned a product or item, and indication 416 indicates that the product or item scanned was a particular article of clothing, and the indication 418 indicates that twenty three comments are available. It should be understood that this example is illustrative and therefore should not be construed as being limiting in any way.

In some embodiments, the feedback available display 412 can include incentives or indicate a charge for the user or other entity to view the feedback 126, though this is not necessarily the case. Thus, for example, entities associated with the feedback 126, the feedback service 112, the computing system 116, and/or other entities may charge for communicating the feedback 126 and/or may offer coupons, discounts, or other incentives to users who view or access the feedback 126. Because the feedback available display 412 can include additional or alternative indicators, it should be understood that this example is illustrative and therefore should not be construed as being limiting in any way.

The feedback available display 412 also can include a UI control 420 for viewing the feedback 126 indicated by the feedback available display 412, a UI control 422 for declining to view the feedback 126 indicated by the feedback available display 412, a UI control 424 for indicating that the feedback 126 indicated as being relevant by the indication 416 is not actually relevant to the user, other UI controls (not shown), combinations thereof, or the like. Selection of the UI controls 420, 422, 424 can cause the user device 102 to provide input to the server computer 114 and/or prompt the feedback application 108 to generate various displays for presentation to the user or other entity. Selection of the UI control 420 can cause the device to display some or all of the feedback 126, for example. Selection of UI control 422 can cause the user device 102 to hide the feedback available display 412 or take other actions. Selection of the UI control 424 can cause the user device 102 to take various actions to determine the relevant item and/or to obtain relevant feedback 126. Because additional and/or alternative actions can be taken in response to selection of one or more of the UI controls 420-424, it should be understood that these embodiments are illustrative, and should not be construed as being limiting in any way.

Referring now to FIG. 4C, a UI diagram showing additional aspects of the concepts and technologies disclosed herein for providing feedback 126 using a feedback service 112 are described in detail. In particular, FIG. 4C shows an illustrative screen display 400C generated by a device such as the user device 102. It should be appreciated that the UI diagram illustrated in FIG. 4C is illustrative of one contemplated example of the UIs that can be generated and/or displayed in accordance with the concepts and technologies disclosed herein, and therefore should not be construed as being limiting in any way.

The screen display 400C can include a feedback presentation screen 430. The feedback presentation screen 430 can be used to present feedback 126 to a user or other entity. It can be appreciated that the feedback presentation screen 430 can be presented in response to a user selecting the UI control 420 shown in FIG. 4B. Because the feedback presentation screen 430 can be displayed at additional and/or alternative times, it should be understood that this embodiment is illustrative, and should not be construed as being limiting in any way.

The feedback presentation screen 430 can include an item indicator 432. The item indicator 432 can indicate a product or other item with which the feedback 126 presented by way of the feedback presentation screen 430 is associated. The illustrated embodiment of the feedback presentation screen 430 includes a thumbnail image 434 of the product or item with which the feedback 126 presented by way of the feedback presentation screen 430 is associated. It should be understood that this example is illustrative and therefore should not be construed as being limiting in any way.

The feedback presentation screen 430 also can include a UI control 436 for changing a selection of the product or item with which the feedback 126 presented by way of the feedback presentation screen 430 is associated. Thus, a user may select an option to view the feedback 126 and discover, upon presentation of the feedback 126 and/or at another time, that the product or item with which the feedback 126 presented by way of the feedback presentation screen 430 is associated is not relevant to the activity of the user.

Thus, the UI control 436 can be used to change the product or item with which the feedback 126 presented by way of the feedback presentation screen 430 is associated. In response to selection of the UI control 436, the user device 102 can take an action similar or even identical to the action taken by the user device 102 in response to detecting a selection of the UI control 424 shown in FIG. 4B, though this is not necessarily the case. It should be understood that this example is illustrative and therefore should not be construed as being limiting in any way.

The feedback presentation screen 430 also can include an average opinion indicator 438, which can indicate an average overall opinion for the product or other item associated with the feedback 126. Although not shown in FIG. 4C, it should be understood that the average opinion indicator 438 can indicate an average opinion as well as a number of comments or other instances of feedback 126 that are represented by the average opinion. The feedback presentation screen 430 also can include a UI control 436 for accessing individual instances of feedback 126 instead of an average opinion. Selection of the UI control 436 can cause the device to present multiple instances of the feedback 126, if desired.

The screen display 400C also can include a UI control 442 for exiting the presentation of the feedback 126 and a UI control 444 for returning to a previous screen display such as the screen display 400B shown in FIG. 4B. Thus, selection of one of the UI controls 442, 444 can cause the user device 102 to hide the screen display 400C and display other screen displays. It should be understood that this example is illustrative and therefore should not be construed as being limiting in any way.

Figure 5:
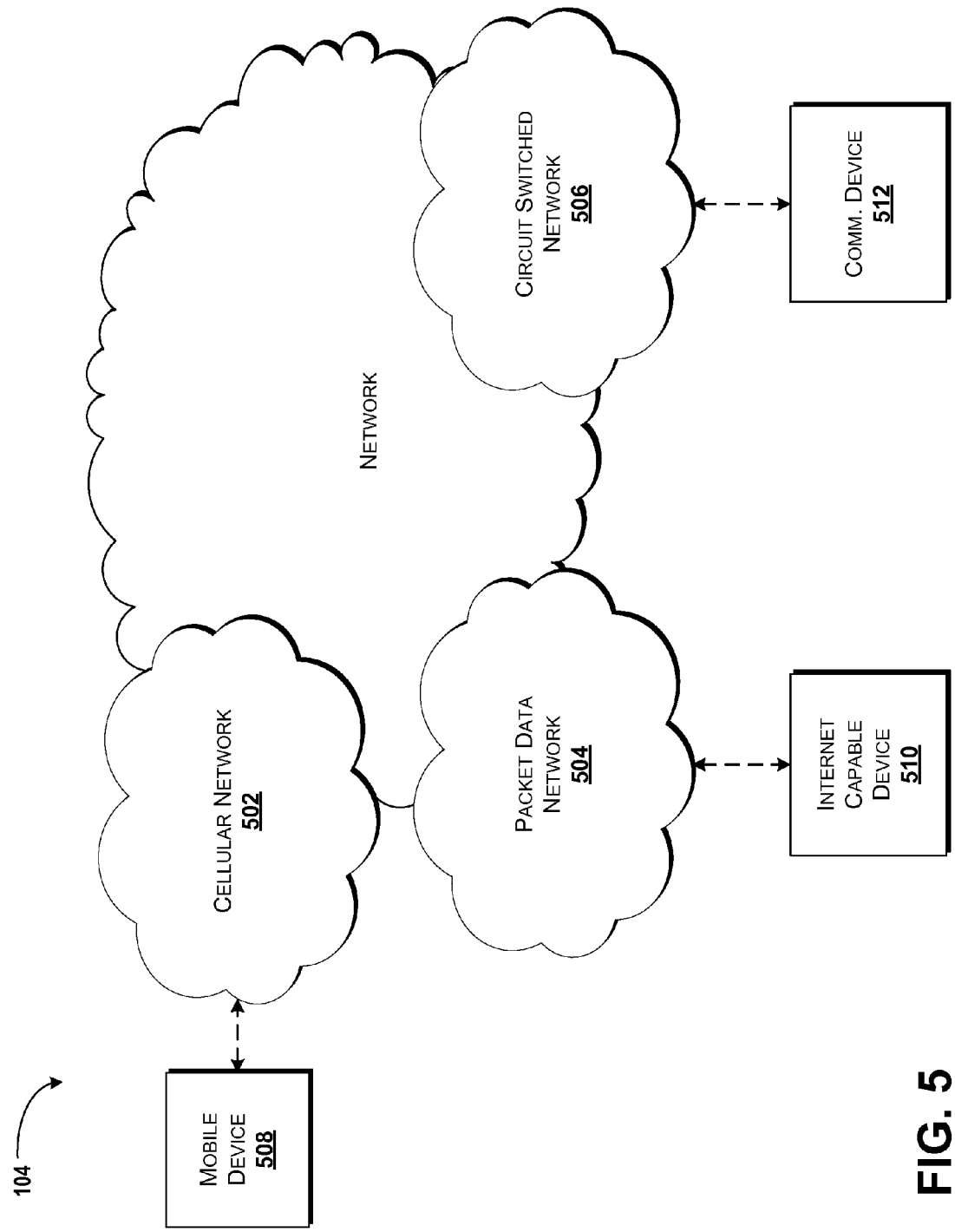
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
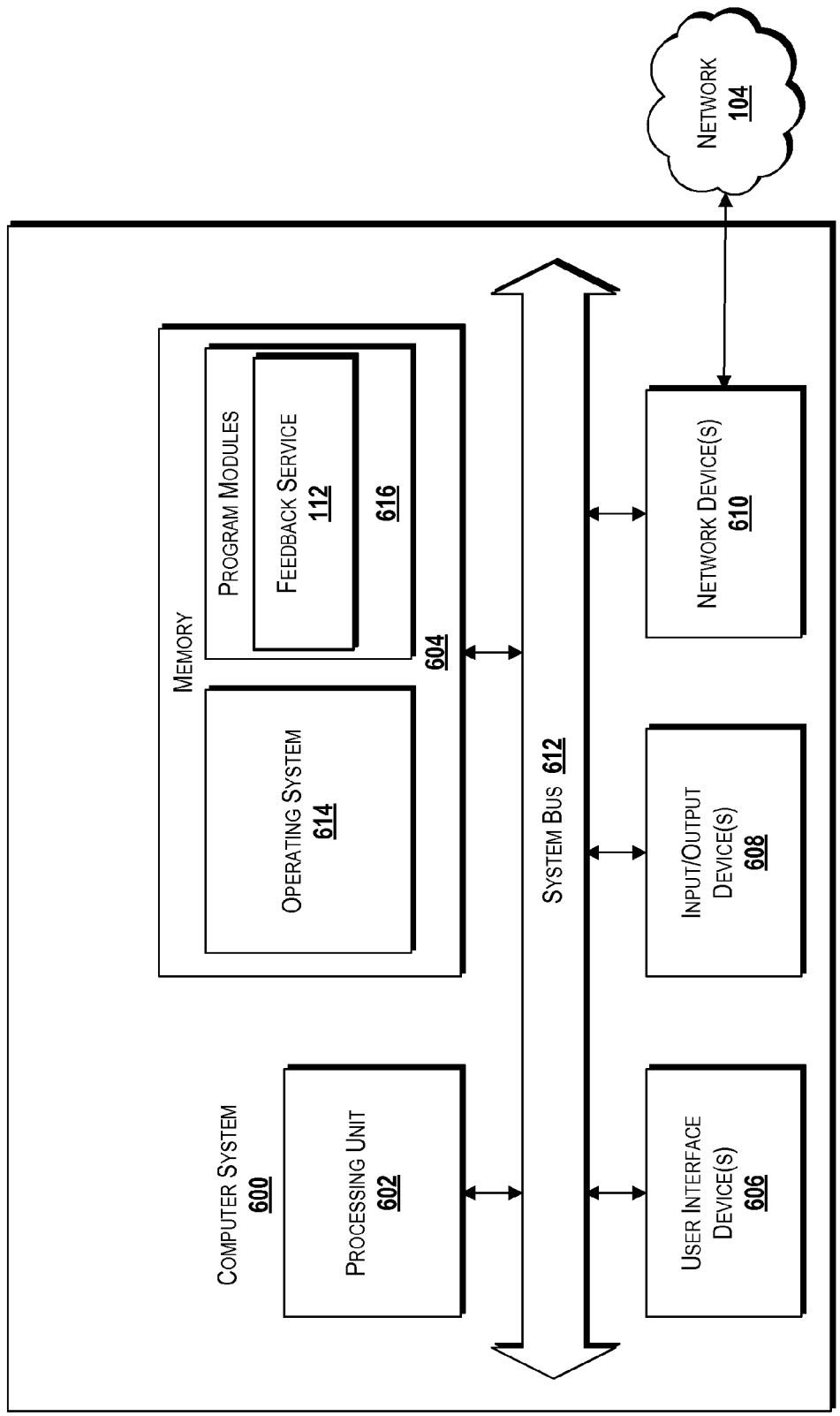
FIG. 6 is a block diagram illustrating an example computer system configured to providing and interacting with a feedback service, according to some illustrative embodiments.

FIG. 6 is a block diagram illustrating a computer system 600 configured to provide the functionality described herein for providing and interacting with a feedback service 112, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the feedback service 112. Because the computing system 600 also can be used to provide the social networking service described herein, the program modules 616 also can include the social networking application 120 or other social networking services or applications. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the templates 118, the activity representation 110, the post 124, the feedback 126, the feedback data 128, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
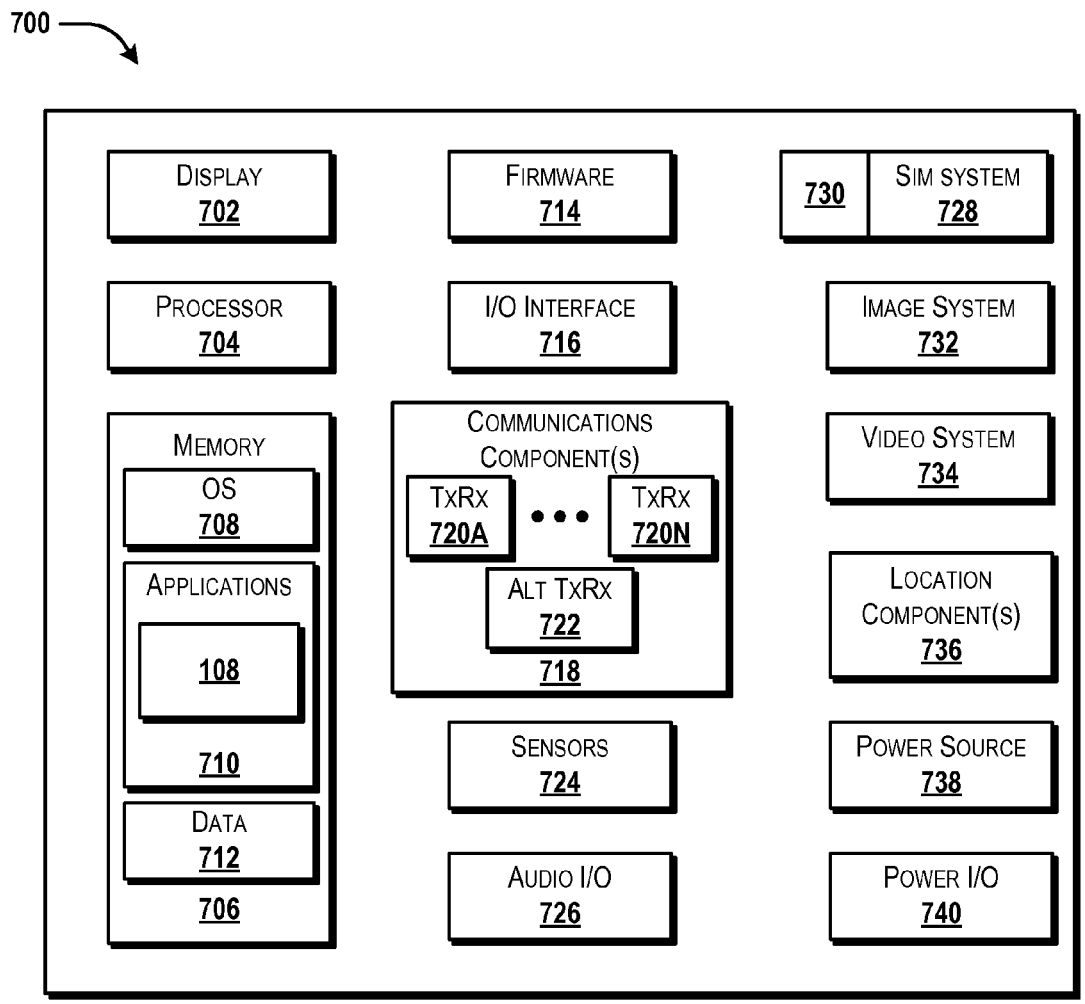
FIG. 7 is a block diagram illustrating an example mobile device configured to interact with a feedback service, according to some illustrative embodiments.

Turning now to FIG. 7, an illustrative mobile device 700 and components thereof will be described. In some embodiments, the user device 102 described above with reference to FIGS. 1-5 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for presenting feedback 126, for capturing or presenting activity representations 110, and/or to present and/or seek approval of a social networking communication such as the post 124, as well as presenting text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the feedback application 108, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating activity representations 110, viewing and/or using or applying templates 118, viewing, creating, and/or approving posts 124, viewing or interacting with feedback 126, configuring settings associated with the feedback application 108, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, activity representations 110, templates 118, posts 124, feedback 126, feedback data 128 and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, activity representations 110, photos, images, videos, audio, templates 118, posts 124, feedback 126, feedback data 128, settings or configurations, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like.

In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and interacting with a feedback service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   receiving, at a first computing device comprising a processor that executes a feedback service, an activity representation from a second computing device comprising a user device that is associated with a user, wherein the second computing device generates the activity representation during monitoring of activity at the second computing device and without involvement from a user of the second computing device, and wherein the activity representation indicates an item interacted with by the second computing device;
   detecting, by the processor by analyzing the activity representation, activity at the second computing device, the activity associated with an item;
   obtaining, by the processor and from a third computing device that is associated with a manufacturer of the item, a template associated with the item, the template comprising a visual depiction of the item;
   obtaining, by the processor, an image of the user, wherein the image is obtained from a social networking service account associated with the user;
   generating, by the processor, data comprising a visual representation by combining the template and the image;
   generating, by the processor and without involvement from the second computing device, a social networking post comprising the visual representation and a solicitation for feedback from a social network associated with the user, wherein the feedback relates to the item;
   obtaining, by the processor and from the social networking service account, feedback relating to the social networking post, the feedback comprising an opinion relating to the item; and
   providing, by the processor, the feedback to the second computing device.

2. The method of claim 1, wherein the feedback comprises comments that relate to the social networking post, the comments associated with social networking connections of the user.

3. The method of claim 1, further comprising:
   generating, by the processor, feedback data comprising a summary of the feedback, wherein the feedback comprises comments that relate to the item, the comments being from social networking connections of the user and being obtained from the social networking service account of the user without involvement of the user; and
   providing, by the processor, the feedback data to the third computing device.

4. The method of claim 1, wherein the activity comprises a scan of visual indicia associated with the item and a request for an electronic search relating to the item.

5. The method of claim 4, wherein the scan comprises an optical scan of a quick response code associated with the item.

6. A system comprising:
   a first device comprising a processor; and
   a memory that stores computer-executable instructions that, when executed by the processor, cause the processor to perform operations comprising receiving an activity representation from a second computing device comprising a user device that is associated with a user, wherein the second computing device generates the activity representation during monitoring of activity at the second computing device and without involvement from a user of the second computing device, and wherein the activity representation indicates an item interacted with by the second computing device,
      detecting, by analyzing the activity representation, activity at the second computing device, the activity associated with an item,
      obtaining, from a third computing device that is associated with a manufacturer of the item, a template associated with the item, the template comprising a visual depiction of the item,
      obtaining an image of the user, wherein the image is obtained from a social networking service account associated with the user,
      generating data comprising a visual representation by combining the template and the image,
      generating, without involvement from the second computing device, a social networking post comprising the visual representation and a solicitation for feedback from a social network associated with the user, wherein the feedback relates to the item,
      obtaining, from the social networking service account, feedback relating to the social networking post, the feedback comprising an opinion relating to the item, and
      providing the feedback to the second computing device.

7. The system of claim 6, wherein the feedback comprises comments that relate to the social networking post, the comments associated with social networking connections of the user.

8. The system of claim 6, wherein the computer-executable instructions, when executed by the processor, cause the processor to perform operations further comprising:
   generating feedback data comprising a summary of the feedback, wherein the feedback comprises comments that relate to the item, the comments being from social networking connections of the user and being obtained from the social networking service account of the user without involvement of the user; and
   providing the feedback data to the third computing device.

9. The system of claim 6, wherein the second computing device comprises a smartphone, wherein the smartphone presents the feedback via a display device of the smartphone, and wherein the feedback comprises demographic information that identifies a location, age, and gender associated with the feedback.

10. A computer storage medium having computer-executable instructions stored thereon that, when executed by a processor, cause the processor to perform operations comprising:
    receiving, at a first computing device, an activity representation from a second computing device comprising a user device that is associated with a user, wherein the user device generates the activity representation during monitoring of activity at the second computing device and without involvement from a user of the second computing device, and wherein the activity representation indicates an item interacted with by the second computing device;

detecting, by analyzing the activity representation, activity at the second computing device, the activity associated with an item;

obtaining, from a third computing device that is associated with a manufacturer of the item, a template associated with the item, the template comprising a visual depiction of the item;

obtaining an image of the user, wherein the image is obtained from a social networking service account associated with the user;

generating data comprising a visual representation by combining the template and the image;

generating, without involvement from the second computing device, a social networking post comprising the visual representation and a solicitation for feedback from a social network associated with the user, wherein the feedback relates to the item;

obtaining, from the social networking service account, feedback relating to the social networking post, the feedback comprising an opinion relating to the item; and providing the feedback to the second computing device.

11. The computer storage medium of claim 10, wherein the computer-executable instructions, when executed by the processor, cause the processor to perform operations further comprising:

generating feedback data comprising a summary of the feedback, wherein the feedback comprises comments that relate to the item, the comments being from social networking connections of the user and being obtained from the social network service account of the user without involvement of the user; and providing the feedback data to the third computing device, wherein the feedback comprises comments that relate to the social networking post.

12. The method of claim 1, further comprising:

accessing, by the processor, a social networking account associated with the user;

obtaining, by the processor and from a fourth device associated with the social networking account, the feedback;

generating, by the processor, feedback data comprising a summary of the feedback, wherein the summary indicates an aspect of the item and a summary of opinions relating to the aspect of the item; and providing, by the processor, the feedback data to the manufacturer to enable rapid prototyping by the manufacturer.

13. The method of claim 12, wherein the summary comprises an indication of demographics associated with the summary of the feedback, the demographics comprising a geographic location and an age.

14. The system of claim 6, wherein the computer-executable instructions, when executed by the processor, cause the processor to perform operations further comprising:

accessing, by the processor, a social networking account associated with the user;

obtaining, by the processor and from a fourth device associated with the social networking account, the feedback;

generating, by the processor, feedback data comprising a summary of the feedback, wherein the summary indicates an aspect of the item and a summary of opinions relating to the aspect of the item; and providing, by the processor, the feedback data to the manufacturer to enable rapid prototyping by the manufacturer.

15. The system of claim 14, wherein the summary comprises an indication of demographics associated with the summary of the feedback, the demographics comprising a geographic location and an age.

16. The computer storage medium of claim 10, wherein the computer-executable instructions, when executed by the processor, cause the processor to perform operations further comprising:

accessing, by the processor, a social networking account associated with the user;

obtaining, by the processor and from a fourth device associated with the social networking account, the feedback;

generating, by the processor, feedback data comprising a summary of the feedback, wherein the summary indicates an aspect of the item and a summary of opinions relating to the aspect of the item; and providing, by the processor, the feedback data to the manufacturer to enable rapid prototyping by the manufacturer.

17. The computer storage medium of claim 16, wherein the summary comprises an indication of demographics associated with the summary of the feedback, the demographics comprising a geographic location and an age.

* * * * *